United States Patent [19]
Soncina et al.

[11] Patent Number: 5,826,460
[45] Date of Patent: Oct. 27, 1998

[54] INTERMEDIATE TOTAL POWER TAKEOFF FOR TRUCKS AND SELF-PROPELLED MACHINES FOR VARIOUS OPERATIONS

[75] Inventors: Giovanni Soncina; Renato Soncina, both of Roe' Volciano, Italy

[73] Assignee: OMSI Trasmissioni S.p.A., Roe' Volciano, Italy

[21] Appl. No.: 674,752

[22] Filed: Jul. 2, 1996

[30] Foreign Application Priority Data

Jul. 3, 1995 [IT] Italy ................................ BS95A0065

[51] Int. Cl.⁶ .................................................. B60K 25/06
[52] U.S. Cl. ..................................... 74/15.88; 74/665 GA
[58] Field of Search ............................ 74/15.88, 665 GA

[56] References Cited

U.S. PATENT DOCUMENTS

| | | | |
|---|---|---|---|
| 1,612,846 | 1/1927 | Williams | 74/15.88 |
| 2,495,988 | 1/1950 | Sheppard | 74/15.88 X |
| 3,982,443 | 9/1976 | Fitch | 74/15.88 |
| 4,813,290 | 3/1989 | Hone | 74/15.88 |

*Primary Examiner*—Allan D. Herrmann
*Attorney, Agent, or Firm*—McGlew and Tuttle

[57] ABSTRACT

A total power takeoff, which is able to be positioned between the transmission and the differential gear of an engine-powered vehicle. At least one user having a driven shaft is provided which is driven by the inlet shaft coming from the transmission. On the driven shaft there is inserted a clutch, which can be engaged and disengaged, for the use of the user without having to stop the inlet shaft of the power takeoff.

15 Claims, 11 Drawing Sheets

INTERMEDIATE TOTAL POWER TAKEOFF FOR TRUCKS AND SELF-PROPELLED MACHINES FOR VARIOUS OPERATIONS

FIELD OF THE INVENTION

The present invention pertains to the total power takeoffs for trucks and self-propelled machines for various operations, and more specifically, to power takeoffs, which are inserted between the transmission and the differential gear of these vehicles or machines, and which are intended for driving at least one user, such as pumps, suction pumps, compressors, etc., utilizing the power of the engine of the vehicle or machines.

BACKGROUND OF THE INVENTION

Power takeoffs, which are engaged for the user and act only on the clutch pedal of the vehicle, and other power takeoffs, which are engaged and do not act directly on the clutch pedal of the vehicle, but drive the pedal itself with a cylinder without approaching it directly, are already well known.

Power takeoffs, which remedy the use of the driving cylinder of the clutch pedal of the vehicle with the application of dry clutches on the shafts of the users themselves, but outside of the power takeoff, are also well known.

SUMMARY AND OBJECTS OF THE INVENTION

The object of the present invention is to propose a power takeoff so as to eliminate:
- the pneumatic cylinder on the clutch pedal and related devices for driving same;
- time waste due to waiting for the inlet shaft to the power takeoff to be stopped every time a user is engaged and disengaged;
- time waste due to the stopping of one of the users every time another user is inserted;
- possible grindings due to engagements being carried out with the inlet shaft not completely stopped;
- expensive, cumbersome and heavy dry clutches applied to users.

In other words, the difference between currently commercially available intermediate total power takeoffs and that proposed here is that it is possible to drive the inlet as a function of one or more users (pumps, suction pumps, compressors, etc.) without having to stop the rotation of the inlet shaft of the power takeoff acting on the clutch of the engine during the engagement phase.

The requirement of stopping the rotation of the inlet shaft is due to the current systems of engagement, which may be with teeth, with broached sleeves or with sliding gears, but which are not allowed to be connected (or inserted) with one another, when they are moving (or rotating).

The objects and advantages of the power takeoff under examination can be accomplished by inserting, inside the power takeoff, a clutch on each shaft for driving the users, such as pumps, suction pumps, compressors or other.

The power takeoff according to the present invention may be equipped with:
- an independent outlet with clutch and disks which can be inserted into an oil bath separately at any time without using the clutch of the vehicle;
- two outlets for master cylinders continually meshing with an inlet shaft and an outlet shaft to the disconnected differential gear;
- two outlets for service pumps continually meshing with an inlet shaft while the shaft on the side of the differential gear is disconnected.

According to the invention, a total power takeoff is provided which can be positioned between the transmission and the differential gear of a self-propelled vehicle and can be driven by the transmission of the vehicle. The power takeoff comprises a body having an inlet shaft which comes from the said transmission and having a splined part. An outlet shaft is provided which is disconnected from the inlet shaft and is connected to the differential gear. A clutch ring is provided which rotates with and slides on the splined part. A central driving gear is mounted on the inlet shaft and is intended for driving at least one driven gear for driving a shaft of a corresponding user, such as pumps, suction pumps or the like. The clutch ring can be moved from a position of connection with, to a position of disconnection from/the outlet shaft. Each driven gear drives the shaft of a related user by means of a clutch, which is arranged inside the body and can be connected and disconnected without stopping the inlet shaft after the clutch ring has been disconnected from the outlet shaft.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Referring to the drawings in particular, in a first embodiment, the power takeoff has a body 30, which has an inlet shaft 31, which is connected to the transmission, and via this, to the engine of a vehicle, and an outlet shaft 32, which is connected to the differential gear of a self-propelled vehicle. The two shafts are in line, but are not connected integrally, but rather they can be engaged or disengaged by means of a clutch ring 34, which is connected in a sliding manner on an integral splined shaft 31a.

A central driving gear 33, which is joined with two lateral driven gears 35, each of which is intended for driving a shaft 37 of a user (not shown) in the form of a pump, suction pump or other, is mounted, idle, on the inlet shaft.

Figures 2, 3, 5:
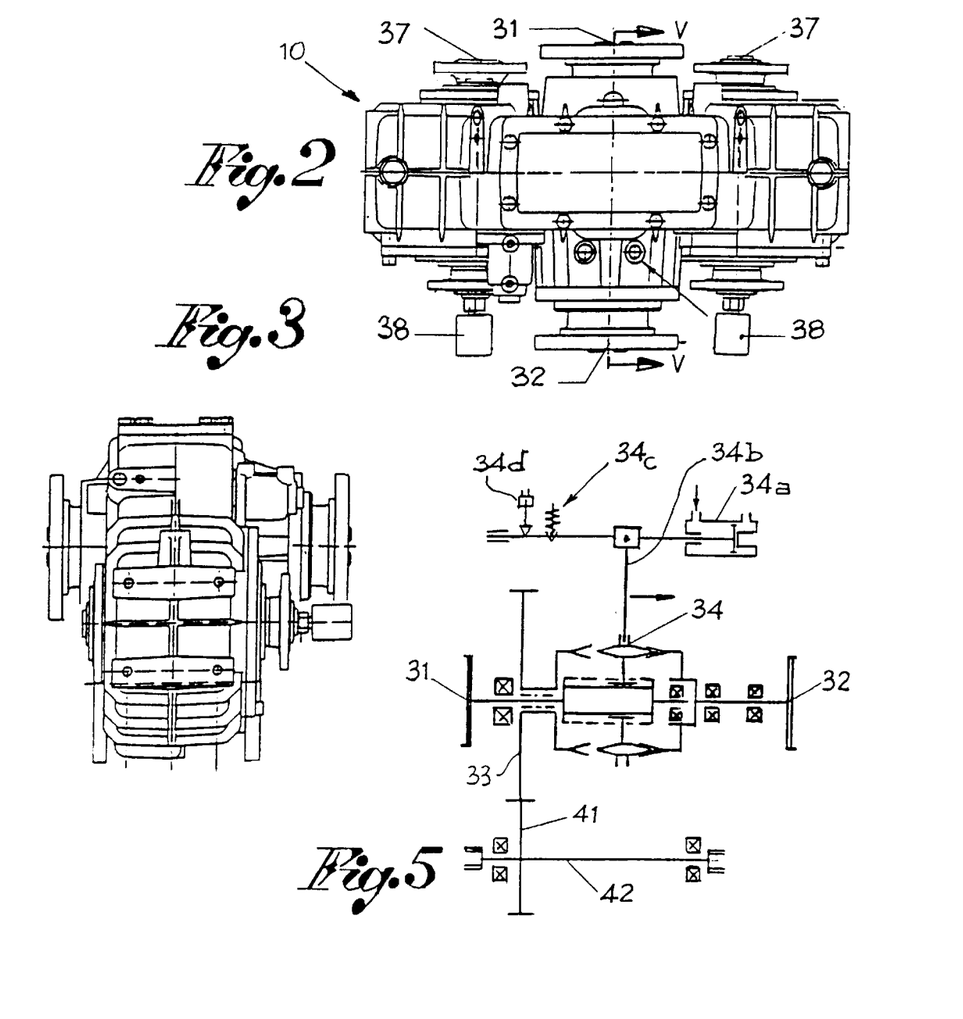
FIG. 2 is a top view thereof.
FIG. 3 is a lateral view thereof.
FIG. 5 is a central schematic section according to the line V—V of FIG. 2 with the power takeoff in the state as in FIG. 4.

The clutch ring 34 can be moved on the splined shaft 31a between a first position of engaging with the outlet shaft 32 and a second position of engaging with the central gear 33, and vice versa. In the first position, the clutch ring 34 connects the inlet shaft 31 integrally with the outlet shaft 32 for the running of the vehicle; in the second position, the shaft ring 34 connects the inlet shaft 31 with the central gear 33 so as to control the rotation of the lateral gears 35 and thus the shafts 37 of the respective users. The movement from one position to the other of the clutch ring 34 is produced by a pneumatic cylinder 34a, which is connected to it by means of a fork 34b (cf. FIG. 5).

A mechanical safety lock 34c, e.g., a spring ball, and an electric gauge 34d, which signals when the clutch ring 34 is connected to the central gear, are advantageously connected to the stem of the cylinder.

However, in the example shown here, each lateral gear 35 does not directly drive the shaft of the related user 37, but by means of a clutch 37a. Actually, the lateral gear 35 is mounted, idle, on the related lateral shaft of the user 37, and the clutch 37a is arranged between the said gear and the said lateral shaft. In detail, the clutch 37a comprises a plurality of integral inner disks 36, which rotate with the gear 35, and a plurality of outer disks on a bell that is integral with and rotates with the shaft of the user 37. The clutch is driven by a pneumatic or oil-dynamic piston 39 fed by means of a manifold 38 and which, moving the outer disks, compacts these disks with the inner disks when it needs to drive the users.

The central gear 33 is also able to drive a shaft 42 for auxiliary service pumps by means of an additional gear 41.

Figure 4:
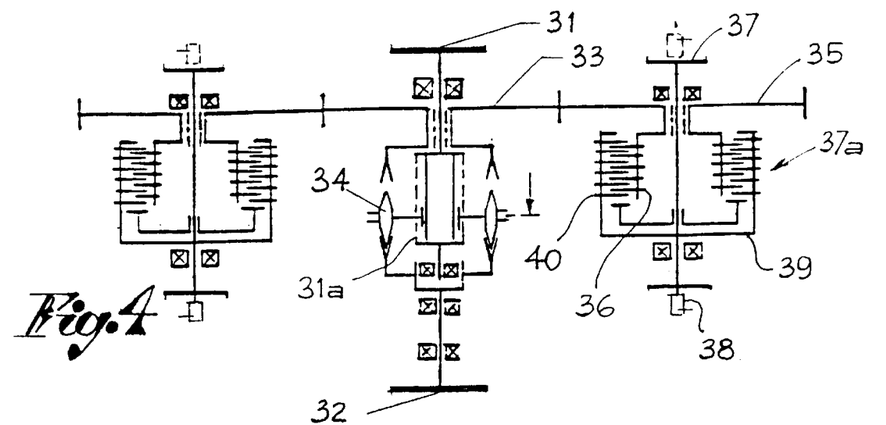
FIG. 4 is a schematic view according to the line IV—IV in FIG. 1 of the power takeoff with the vehicle in a state of moving and the power takeoff in a stopped state.

In the embodiment just described, the clutch ring 34, if moved towards the outlet shaft 32, releases the central gear 33 and brings about the connection between the inlet shaft 31 and the outlet shaft 32, thus making the running of the vehicle possible (FIG. 4).

Figure 6:
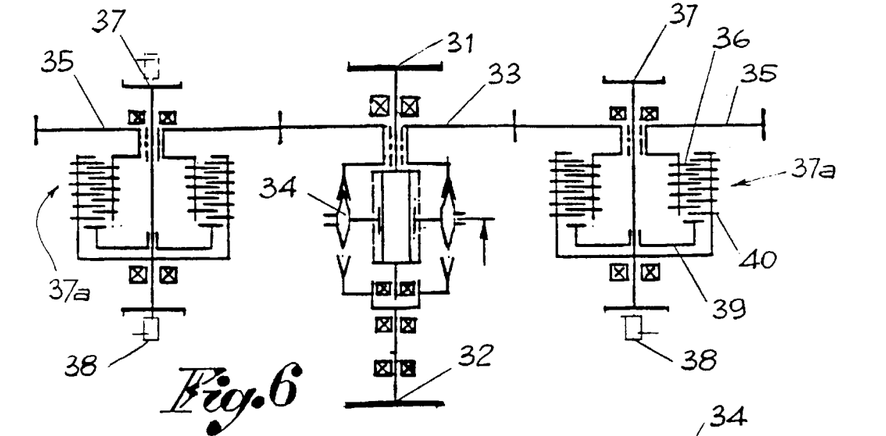
FIG. 6 is a schematic view as in FIG. 4, but with the vehicle in a stopped state and the power takeoff in a state of moving.
Figure 7:
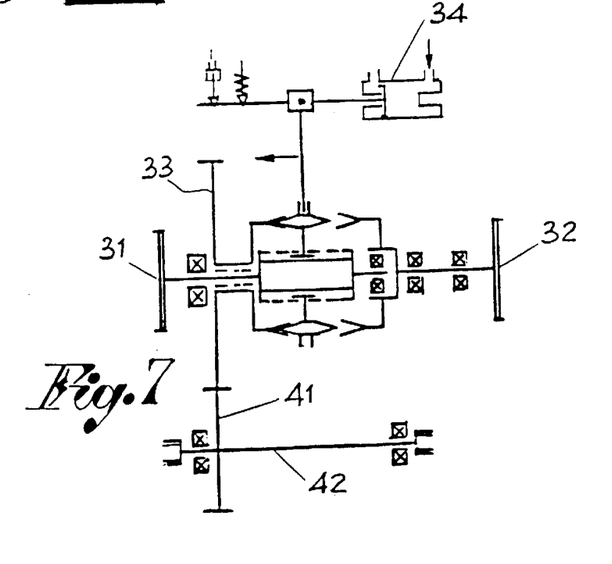
FIG. 7 is a central schematic view as in FIG. 5, but with the power takeoff in the state as in FIG. 6.
Figure 8:
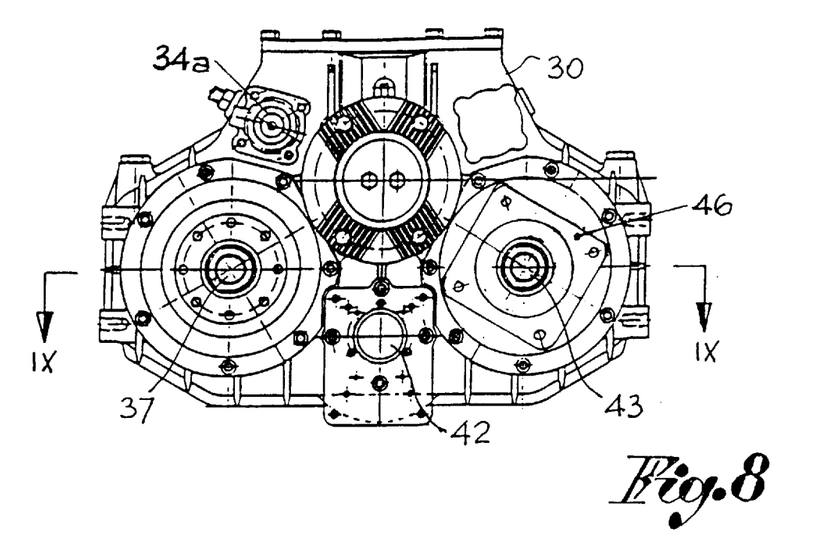
FIG. 8 is a front view of a second embodiment of the power takeoff.
Figure 9:
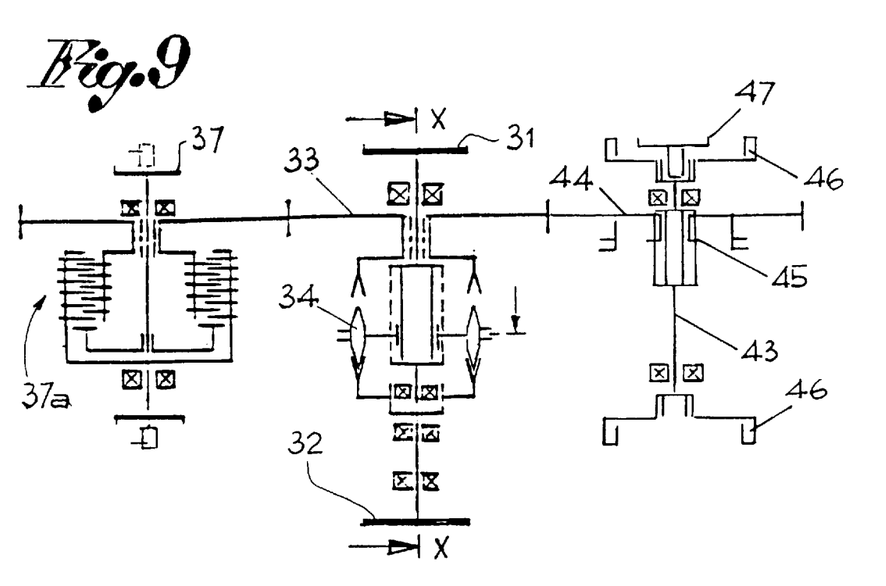
FIG. 9 is a schematic view according to the line IX—IX in FIG. 8 with the vehicle in a state of moving and the power takeoff in a stopped state.
Figures 10, 11, 12:
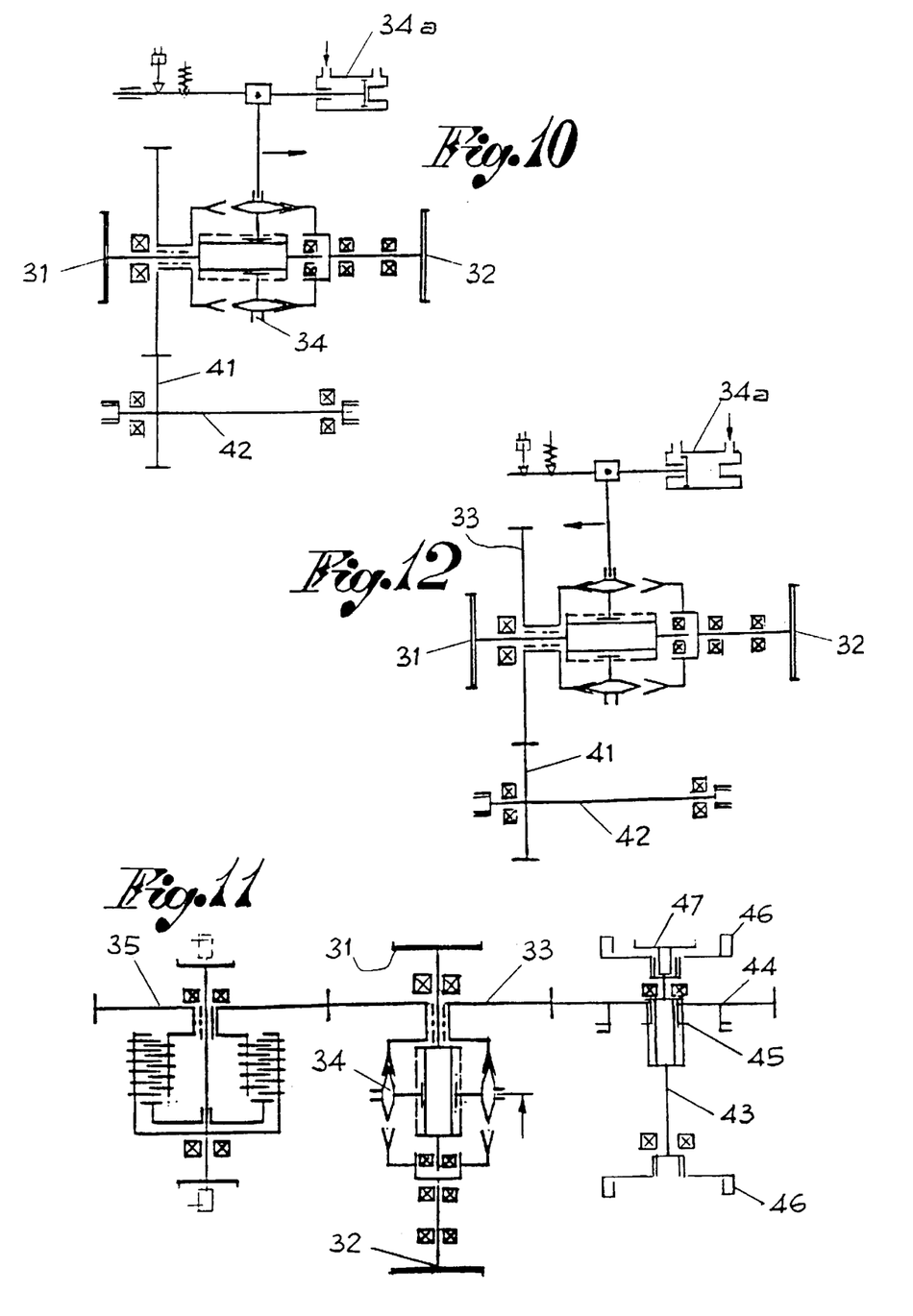
FIG. 10 is a schematic section according to the line X—X in FIG. 9.
FIG. 11 is a schematic view as in FIG. 9, but with the vehicle in a stopped state and the power takeoff in a moving state.
FIG. 12 is a schematic section as in FIG. 10, but with the power takeoff in the state as in FIG. 11.
Figure 13:
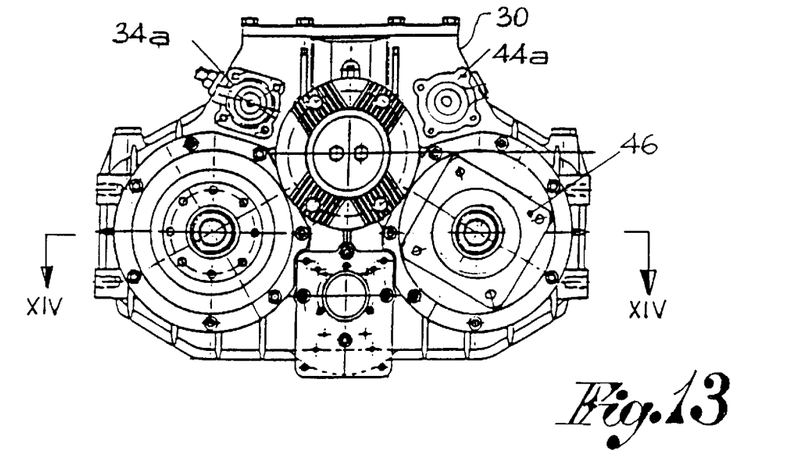
FIG. 13 is a front view of a third embodiment of the power takeoff.
Figure 14:
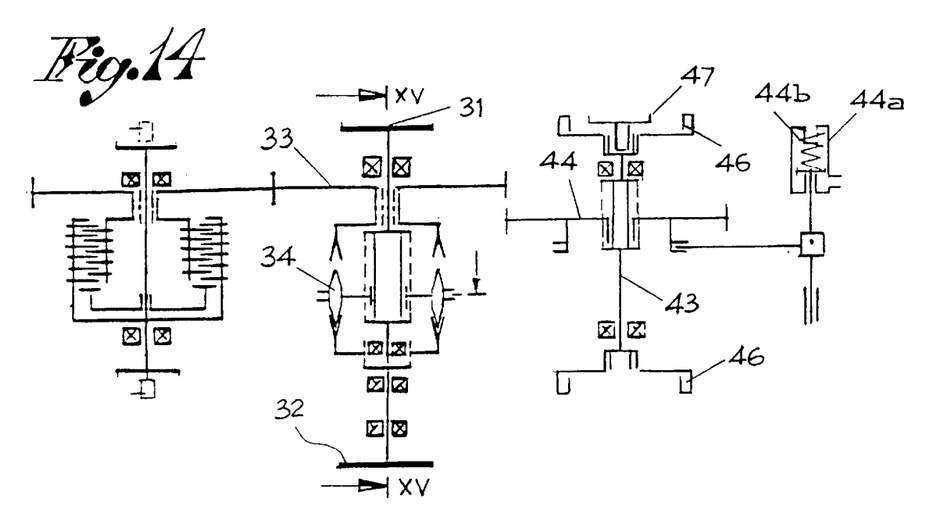
FIG. 14 is a schematic view according to the line XIV—XIV in FIG. 13 with the vehicle in a moving state and the power takeoff in a stopped state.
Figure 15:
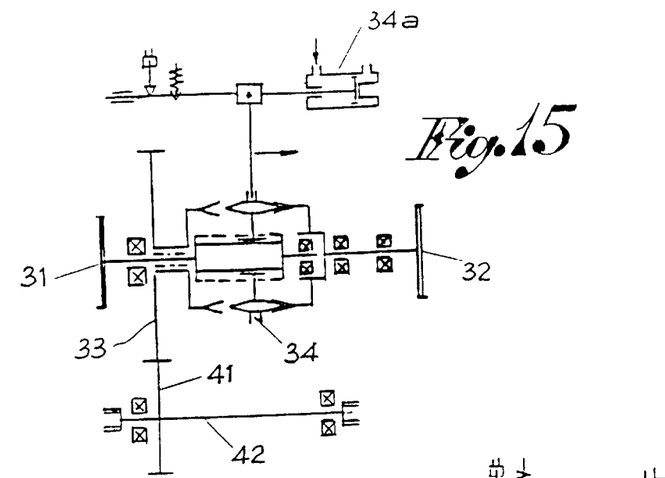
FIG. 15 is a schematic section according to the line XV—XV in FIG. 14.
Figure 16:
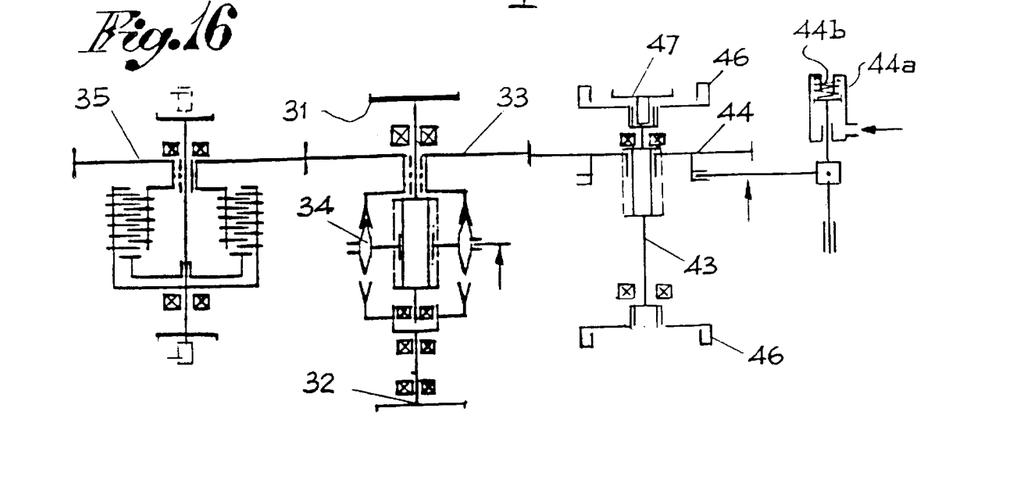
FIG. 16 is a schematic view as in FIG. 14, but with the vehicle in a stopped state and the power takeoff in an inserted state.
Figure 17:
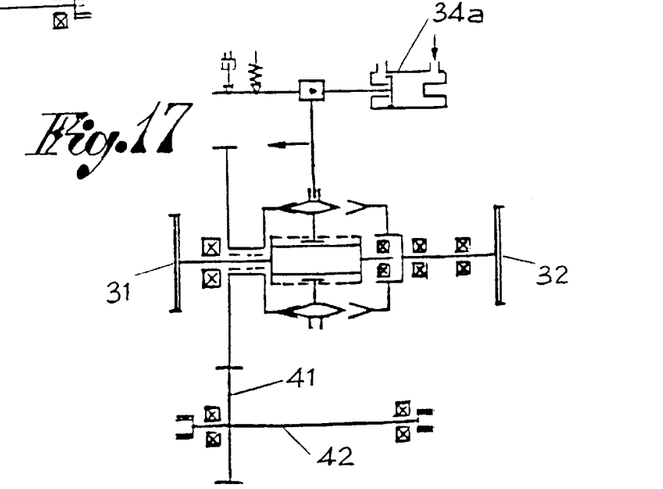
FIG. 17 is a schematic section as in FIG. 15, but with the power takeoff in the state as in FIG. 16.
Figure 18:
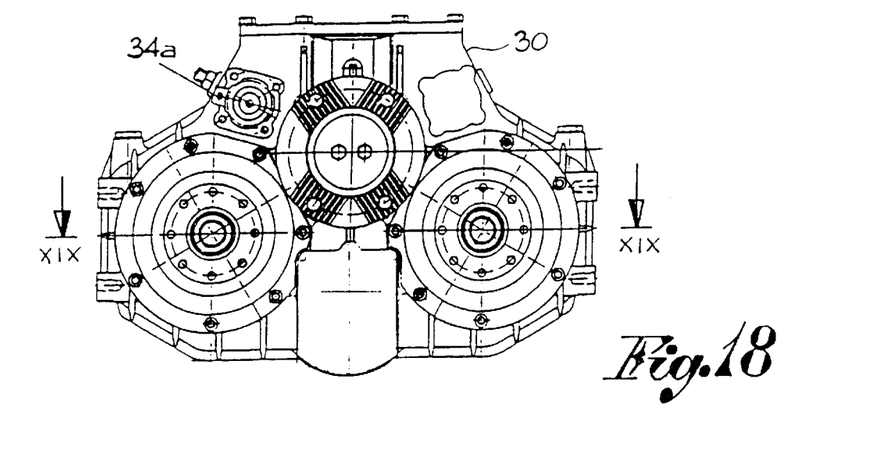
FIG. 18 is a front view of another embodiment of the power takeoff.
Figure 19:
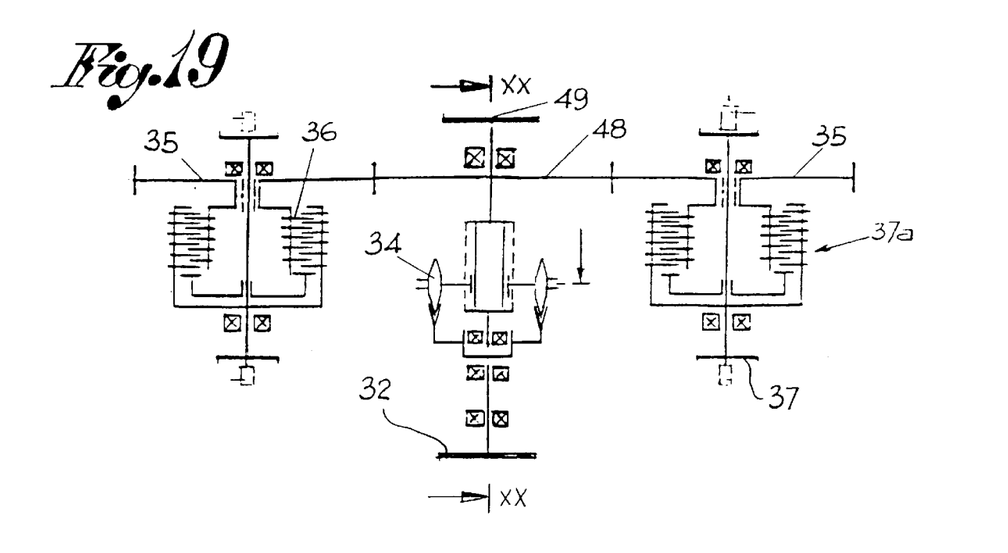
FIG. 19 is a schematic view according to the line XIX—XIX in FIG. 18 with the vehicle in the moving state and the power takeoff still inserted.
Figure 20:
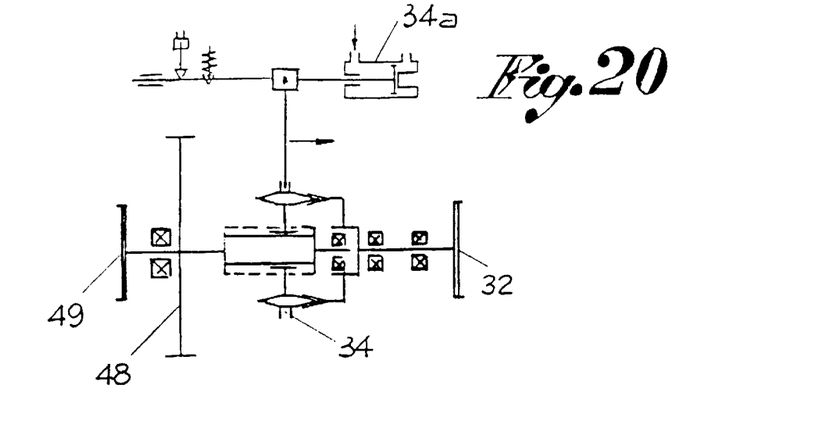
FIG. 20 is a schematic section according to the line XX—XX in FIG. 19.
Figure 21:
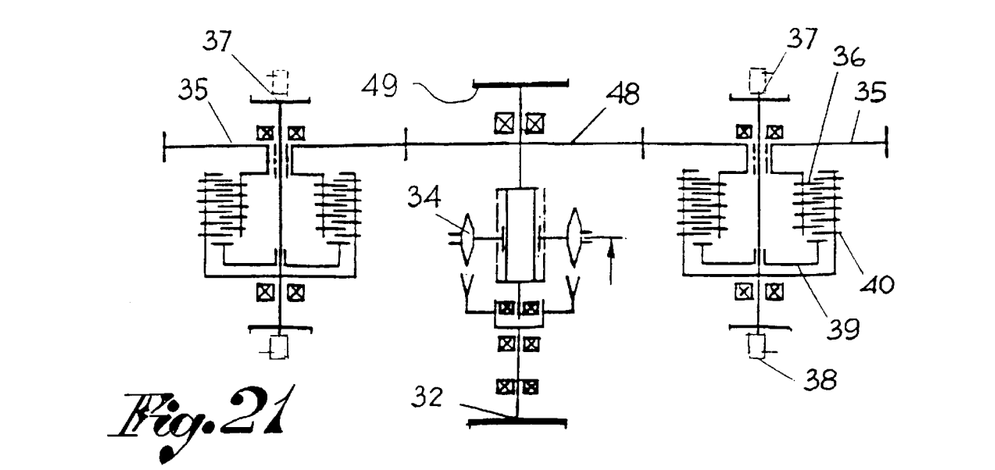
FIG. 21 is a schematic view as in FIG. 19, but with the vehicle in a stopped state and the power takeoff still inserted.
Figure 22:
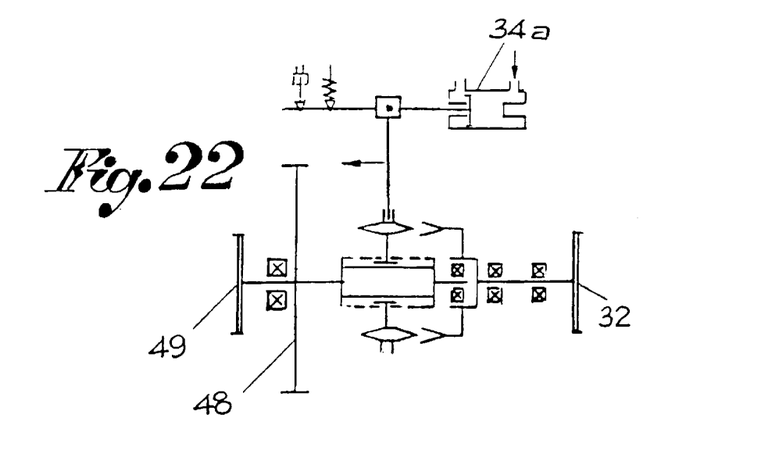
FIG. 22 is a schematic section as in FIG. 20, but with the power takeoff in the state as in FIG. 21.
Figure 23:
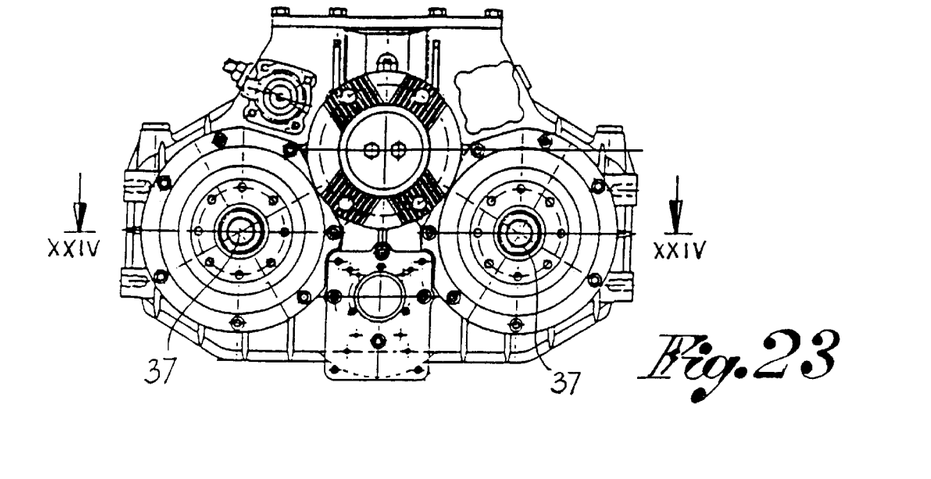
FIG. 23 is a front view of another embodiment of the power takeoff.
Figure 24:
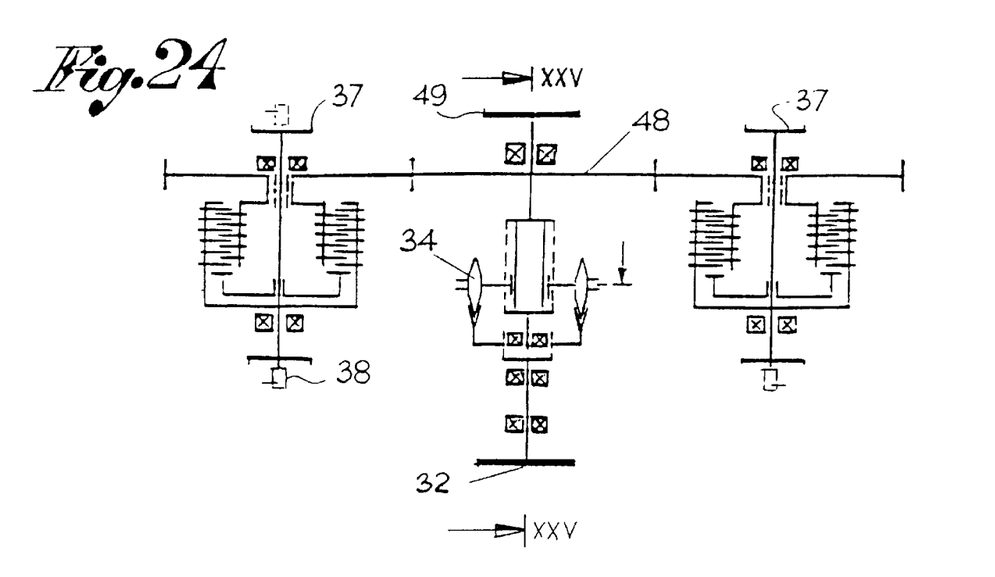
FIG. 24 is a schematic view according to the line XXIV—XXIV in FIG. 23 with the vehicle in the moving state and the power takeoff still inserted.
Figures 25, 27:
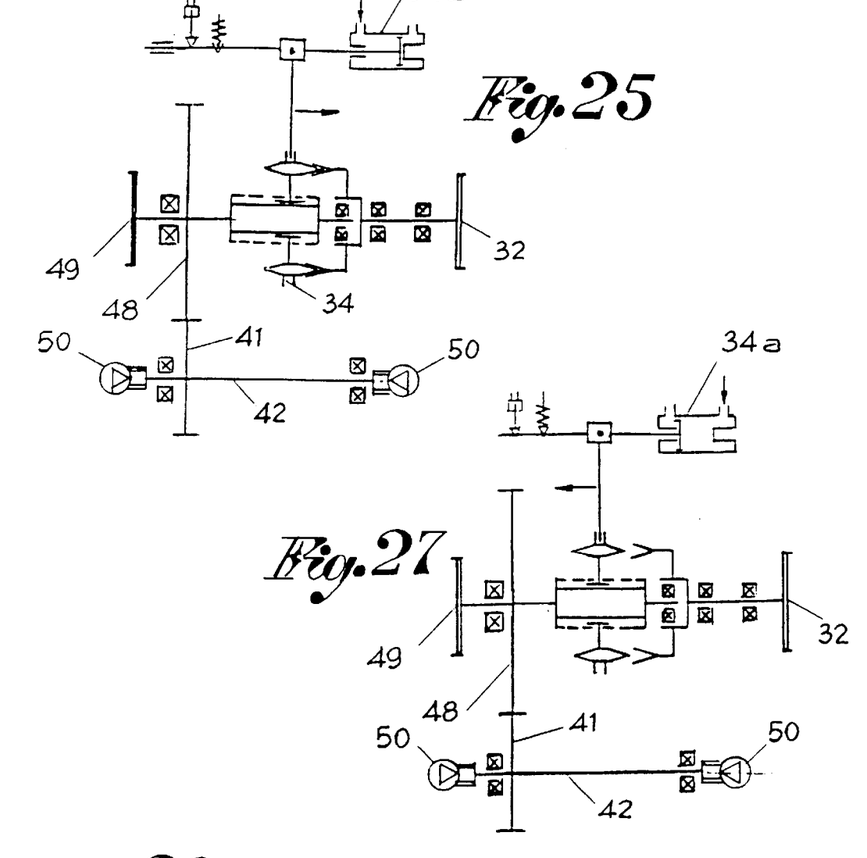
FIG. 25 is a schematic section according to the line XXV—XXV in FIG. 24.
FIG. 27 is a schematic section according to the line XXVII—XXVII in FIG. 26.
Figure 26:
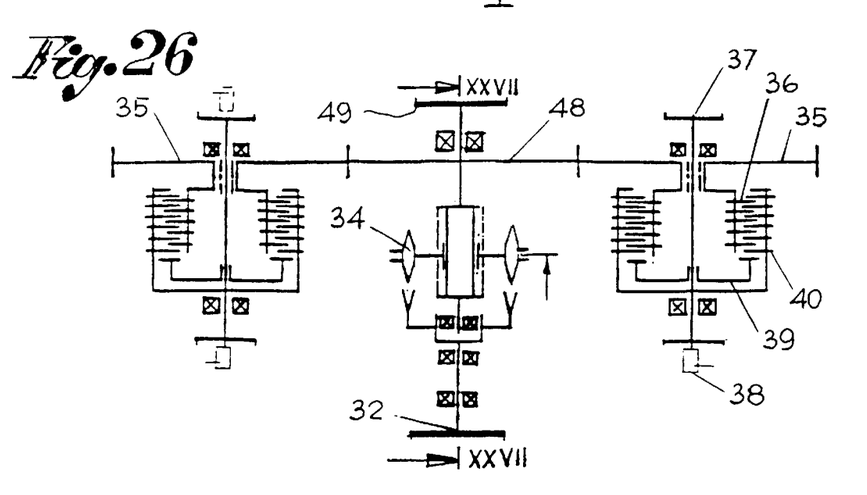
FIG. 26 is a schematic view as in FIG. 24, but with the vehicle in a stopped state and the power takeoff still inserted.

If the ring 34 is moved towards the central gear 33, it releases the outlet shaft 32 and brings about the connection between the inlet shaft 31 and the central gear 33, thus making possible the use of the power takeoff for the driving of the users with the vehicle in the stopped state (FIG. 6).

In practice, the operations of engaging and disengaging the power takeoff must be carried out with the vehicle and the inlet shaft in the stopped state.

Then, with the vehicle positioned (braked), the rotation of the inlet shaft 31 is stopped, and sending air to the cylinder 34a with any, even remote, drive, the shaft 31 is connected to the central gear 33 by means of the clutch ring 34.

Once this operation, starting the appropriate running and releasing the clutch of the vehicle, has been carried out, the central gear 33 is rotated, which, in its turn, transmits the rotation to the lateral gears 35 and to the lower gear 41 of the auxiliary user.

The gears 35 then rotate the inner disks 36 of the clutch, while the gear 41 rotates the shaft by means of the shaft 42 for the auxiliary services.

However, air or oil under pressure must be sent to the rotating manifolds 38 in order to rotate the lateral shafts 37. The air under pressure acts on the pistons 39, which compact the outer disks 40 of the clutch bell with the inner disks 36, which have already been rotated by the lateral gears 35.

Removing the air to the rotating manifolds 38 is sufficient to stop the rotation of the lateral shafts 37.

Therefore, in order to drive and to stop the users, it is not necessary to act directly on the clutch pedal of the vehicle; each of the users is able to be activated separately and independently from one another, and the users are then disengaged automatically, with everything remaining inoperative, as soon as the clutch ring is moved for the transfer of the power from the transmission to the differential gear for the running of the vehicle on the road.

The second embodiment of the power takeoff illustrated in FIGS. 8–12 is completely similar in design and in operation to that described in relation to FIGS. 1–7, except that a shaft 37 with a clutch 37a for one user and a splined shaft 43 for master cylinders that are flanged directly to the power takeoff itself, with these also being able to be used when the vehicle is in a stopped state, are provided in this second embodiment. A lateral gear 44, which is held in position by an elastic ring 45 (FIGS. 9–11), is then mounted on the splined shaft 43. When the central gear 33 is rotated with the vehicle in the stopped state, the lateral gear 44 is rotated by the central gear.

Two toothed seats for the shafts of pumps, which are applied to the power takeoff by means of suitable flangings 46, are provided at the two ends of the splined shaft 43, which is driven by the gear 44. Reduction sleeves as well as transmission flanges 47 for cardanic shafts, if desired, may be inserted into these toothed seats.

The third embodiment of the power takeoff illustrated in FIGS. 13–17 is essentially the same as the second embodiment, but the lateral gear 44 slides on the splined shaft 43 to be connected with and disconnected from the central gear 33.

The lateral gear 44 is no longer held by an elastic ring and can be moved by a pneumatic cylinder 44a for its connection with and disconnection from the central gear 33. These operations must be done with the vehicle in the stopped state and the inlet shaft 31 in the stopped state.

The pneumatic cylinder 44a has a return spring 44b on its inside, which disconnects the gear 44 from the gear 33 when the air is removed.

The fourth embodiment of the power takeoff illustrated in FIGS. 18–22 is essentially similar to the first embodiment, but here the central gear 48 is connected directly with and rotates continually with the inlet shaft 49 coming from the transmission. The lateral gears 35 and the inner disks of the clutch 36 also rotate in this manner. This may occur either with the vehicle moving or with the vehicle stopped. The auxiliary shaft for users (service pumps) is not provided in this embodiment.

The shaft 49 coming from the transmission is connected to the outlet shaft 32 by means of the clutch ring 34 during the running of the vehicle.

The power takeoffs can then be used either with the machine moving or with the machine stopped. For the use of the power takeoff with the vehicle moving (FIG. 19), since the disks 36 of the clutch are already rotating, it is only necessary to send air or oil to the rotating manifolds 38 in order to close the outer disks 40 with the inner disks of the clutch, because the shafts 37 rotate, driving the respective users. For the use of the power takeoff with the vehicle stopped, the outlet shaft 32 is disconnected from the inlet shaft 49 with a movement of the clutch ring 34 (FIG. 21) by the cylinder 34a.

The users are driven as in the case of the moving power takeoff by means of activating or not activating the clutches.

Another embodiment of the power takeoff, as shown in FIGS. 23–27, is similar to that described in FIGS. 18–22, but also comprises a gear 41 and a shaft 42 for an auxiliary user, which can be connected and disconnected by means of disengagement means 50 that make it possible to prevent the rotation of the pumps during the running of the vehicle.

Figure 1:
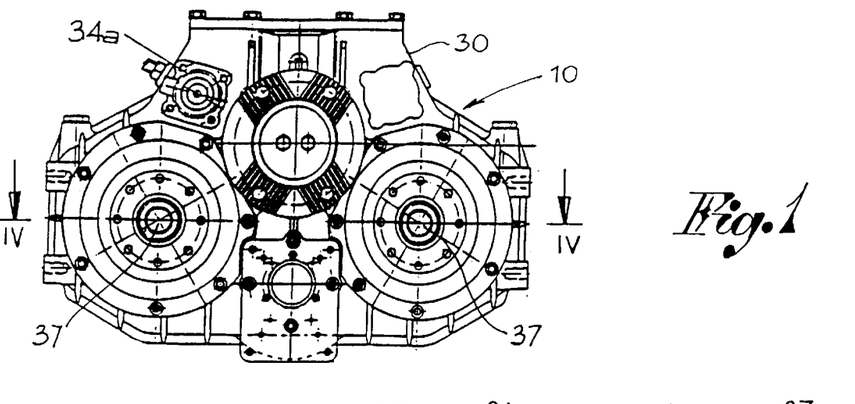
FIG. 1 is a front view of a first embodiment of the power takeoff.
Figure 28:
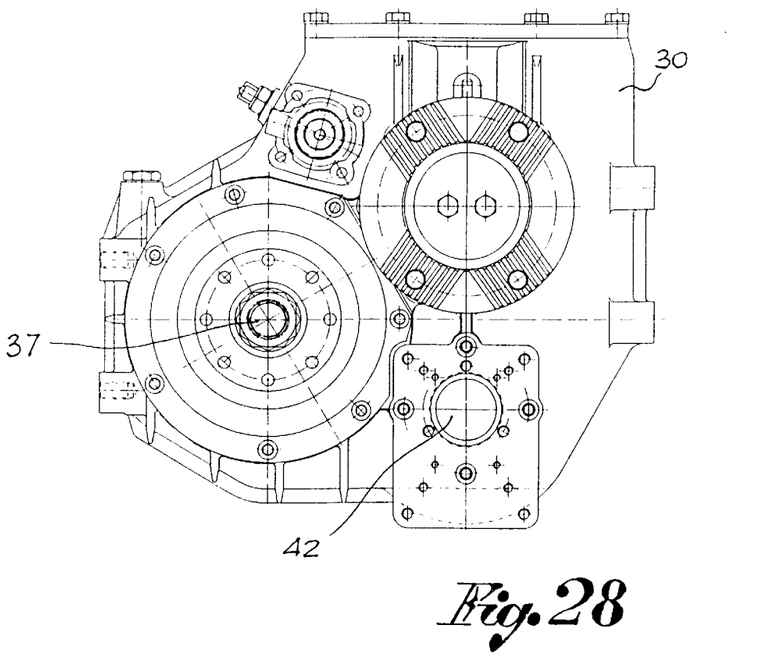
FIGS. 28, 28a show external views of power takeoffs for a single user on the left and on the right, respectively.
Figure 28A:
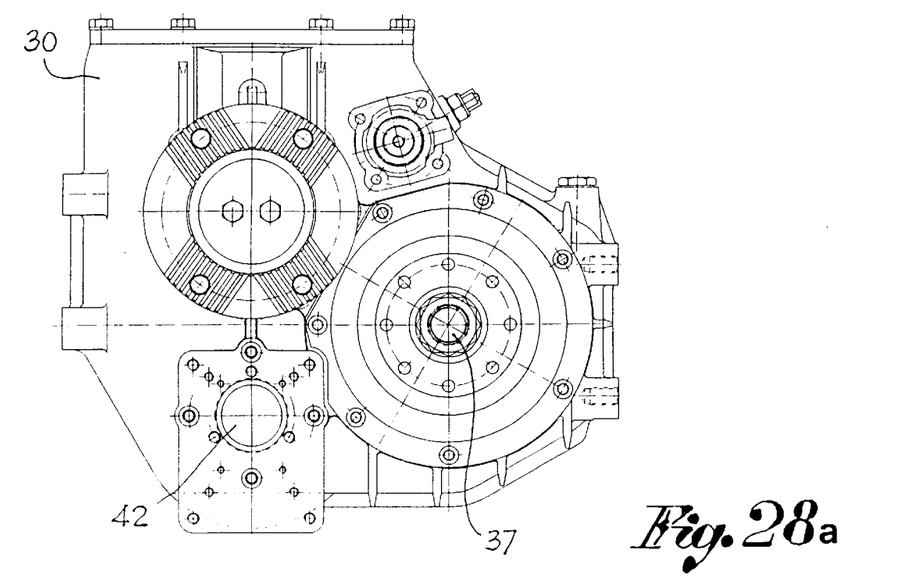

Yet another embodiment of the power takeoff as shown in FIGS. 28, 28a is similar to that of FIG. 1, but has only one shaft 37 for users with a clutch in the left or right version, plus the shaft 42 for the auxiliary service pumps.

While specific embodiments of the invention have been shown and described in detail to illustrate the application of the principles of the invention, it will be understood that the invention may be embodied otherwise without departing from such principles.

What is claimed is:

1. A total power takeoff, positionable between a transmission and a differential gear of a self-propelled vehicle and drivable by the transmission of the vehicle, the takeoff comprising:

a body having an inlet shaft and having a splined part;

an outlet shaft, which is disconnected from said inlet shaft;

a clutch ring, which rotates with and slides on said splined part, said clutch ring being movable between a position of connection with, to a position of disconnection from, said outlet shaft;

a central driving gear mounted on said inlet shaft;

a driven gear for driving a shaft of a corresponding user, said central driving gear driving said driven gears;

clutch means arranged inside said body for connecting said driven gear to, and for driving of, said shaft of a corresponding user, said clutch means connecting and disconnecting said driven gear and said shaft of a corresponding user without stopping said inlet shaft, after said clutch ring has been disconnected from said outlet shaft.

2. A power takeoff in accordance with claim 1, further comprising an additional driven gear for driving a corresponding another user shaft, providing parallel users, each of said parallel users having an inner clutch of said clutch means, said clutch means being normally released and connected with a pneumatic or oil-dynamic drive means, which can be driven even at a distance.

3. A power takeoff in accordance with claim 1, further comprising an additional driven gear for driving a corresponding another user shaft, providing parallel users, one of said parallel users having a shaft driven by means of an inner clutch of said clutch means and the other of said parallel users having said another user shaft connected and driven directly with said related driven gear, said clutch means being normally released and connected with a pneumatic or oil-dynamic drive means, which can be driven even at a distance.

4. A power takeoff in accordance with the claim 1, wherein the said clutch means comprises a first series of disks which are fixed and which rotate with said driven gear, and a second series of disks which are supported by a bell rotating with said shaft of the user, the said driven gear is mounted, idle, on said shaft of a corresponding user, and pneumatic actuator means for actuating said first and said second series of clutch disks for moving said shaft of the user by means of said clutch means and in response to the rotation of the said driven gear.

5. A power takeoff in accordance with claim 1, wherein said central driving gear is idle on said inlet shaft, and said clutch ring is movable alternately to be connected with said outlet shaft for the running of the vehicle and with said driving gear for driving same and a corresponding user with the vehicle in the stopped state.

6. A power takeoff in accordance with claim 1, wherein said central driving gear is fixed and rotates with said inlet shaft, and said clutch ring is connected with said outlet shaft for the running of the vehicle and for possibly driving a user with the vehicle moving, and is disconnected from said outlet shaft for driving the user with the vehicle in the stopped state.

7. A power takeoff in accordance with claim 3, wherein said driven gear, which directly drives said shaft of a corresponding user, is fixed axially on said shaft and permanently meshes with said driving gear.

8. A power takeoff in accordance with claim 3, wherein said driven gear directly drives said shaft of a corresponding user and moves axially on said shaft itself and can be moved between a position of engaging with, and a position of disengaging, from said driving gear.

9. A power takeoff in accordance with claim 1, further comprising an additional gear and an auxiliary shaft for additional users, said additional gear being arranged in parallel with the said inlet and outlet shafts and being driven by said central driving gear, said auxiliary shaft being provided with engaging/disengaging means.

10. A power takeoff positionable between a transmission and a differential gear of a self-propelled vehicle, the takeoff comprising:

a body;

an inlet shaft arranged in said body and connectable to the transmission, said inlet shaft having a splined part;

an outlet shaft arranged in said body, said outlet shaft being separate from said inlet shaft and connectable to the differential gear;

a clutch ring arranged in said body, said clutch ring rotating with, and sliding on said splined part of said inlet shaft, said clutch ring being movable between a first position of connection with said outlet shaft, and a second position of disconnection from said outlet shaft;

a central driving gear arranged in said body and mounted on said inlet shaft;

a driven gear arranged in said body and constantly engaged with said central driving gear;

a user shaft arranged in said body;

clutch means arranged inside said body for connecting said driven gear to, and for driving, said user shaft, said clutch means connecting and disconnecting said driven gear and said user shaft during rotation of said inlet shaft and said driven gear.

11. A power takeoff in accordance with claim 10, further comprising:

an additional driven gear arranged in said body and constantly engaged with said central driving gear;

another user shaft arranged in said body;

another clutch means arranged inside said body for connecting said another driven gear to, and for driving, said another user shaft, said another clutch means connecting and disconnecting said another driven gear and said another user shaft during rotation of said inlet shaft and said driven gear.

12. A power takeoff in accordance with claim 10, wherein:

said clutch ring in said first position disconnects said central driving gear from said inlet shaft, and said clutch ring in said second position connects said central driving gear to said inlet shaft.

13. A power takeoff in accordance with claim 11, wherein:

said clutch ring in said first position disconnects said central driving gear from said inlet shaft, and said clutch ring in said second position connects said central driving gear to said inlet shaft.

14. A power takeoff in accordance with claim 10, wherein:

said central driving gear is rotationally fixed to said inlet shaft, for driving a corresponding another user shaft.

15. A power takeoff in accordance with claim 10, wherein:

said clutch means includes a first series of disks which are rotationally fixed to said driven gear, and a second series of disks which are rotationally fixed to said user shaft, said first and second set of disks being axially movable toward and away from each other to connect and disconnect said driven gear from said user shaft.

* * * * *